United States Patent
Onderko et al.

(10) Patent No.: US 7,623,036 B2
(45) Date of Patent: Nov. 24, 2009

(54) ADJUSTING DATA TAG READERS WITH FEED-FORWARD DATA

(75) Inventors: John Christian Onderko, Appleton, WI (US); Michael Donald O'Shea, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 415 days.

(21) Appl. No.: 11/468,556

(22) Filed: Aug. 30, 2006

(65) Prior Publication Data

US 2006/0290472 A1  Dec. 28, 2006

Related U.S. Application Data

(63) Continuation-in-part of application No. 10/976,993, filed on Oct. 29, 2004, now Pat. No. 7,221,269.

(51) Int. Cl.
*G08B 13/14* (2006.01)
(52) U.S. Cl. ............... 340/572.1; 340/539.13; 340/572.8
(58) Field of Classification Search ............ 340/539.13, 340/572.1, 572.8
See application file for complete search history.

(56) References Cited

U.S. PATENT DOCUMENTS

| | | | |
|---|---|---|---|
| 3,832,530 A | 8/1974 | Reitboeck et al. | |
| 4,135,184 A | 1/1979 | Pruzick | |
| 4,833,591 A | 5/1989 | Eckl | |
| 4,920,255 A | 4/1990 | Gabeler | |
| 5,221,831 A | 6/1993 | Geiszler | |
| 5,525,788 A | 6/1996 | Bridgelall et al. | |
| 5,771,657 A | 6/1998 | Lasher et al. | |
| 6,094,173 A | 7/2000 | Nylander | |
| 6,351,215 B2 | 2/2002 | Rodgers et al. | |
| 6,669,089 B2 | 12/2003 | Cybulski et al. | |
| 6,687,609 B2 | 2/2004 | Hsiao et al. | |
| 6,696,954 B2 | 2/2004 | Chung | |
| 6,703,935 B1 | 3/2004 | Chung et al. | |
| 6,750,769 B1 | 6/2004 | Smith | |
| 6,765,476 B2 | 7/2004 | Steele et al. | |
| 6,946,950 B1 * | 9/2005 | Ueno et al. | 340/10.1 |
| 6,957,777 B1 * | 10/2005 | Huang | 235/492 |
| 6,958,677 B1 * | 10/2005 | Carter | 340/10.1 |

(Continued)

FOREIGN PATENT DOCUMENTS

DE     29800833 U1    4/1998

(Continued)

OTHER PUBLICATIONS

"Avante—RFID Access Portals", http://www.aitechnology.com/aventetech/home.html, printed Mar. 10, 2005, 4 pages, AIT, Inc., USA.

(Continued)

*Primary Examiner*—Daryl Pope
(74) *Attorney, Agent, or Firm*—Armstrong Teasdale LLP

(57) ABSTRACT

Adjusting a configurable parameter of a data tag reader responsive to data about a moving article to improve reading of a data tag on the article. A controller adjusts the data tag reader as a function of a value related to the data tag, data tag reader, or article. Adjusting the data tag reader provides improved reading of the data tag on the moving article.

23 Claims, 6 Drawing Sheets

U.S. PATENT DOCUMENTS

| | | |
|---|---|---|
| 7,053,775 B2 * | 5/2006 | Moore .................. 340/572.1 |
| 7,081,818 B2 * | 7/2006 | Eckstein et al. ......... 340/572.1 |
| 2002/0044058 A1 | 4/2002 | Heinrich et al. |
| 2002/0050518 A1 | 5/2002 | Roustaei |
| 2002/0104013 A1 | 8/2002 | Ghazarian |
| 2002/0147042 A1 | 10/2002 | Vuong et al. |
| 2002/0180588 A1 | 12/2002 | Erickson et al. |
| 2002/0196126 A1 | 12/2002 | Eisenberg et al. |
| 2003/0003997 A1 | 1/2003 | Vuong et al. |
| 2003/0117268 A1 | 6/2003 | Hewitt et al. |
| 2003/0125836 A1 | 7/2003 | Chirnomas |
| 2003/0146233 A1 | 8/2003 | Chirnomas |
| 2003/0174099 A1 | 9/2003 | Bauer et al. |
| 2003/0183699 A1 | 10/2003 | Masui |
| 2003/0195043 A1 | 10/2003 | Shinners et al. |
| 2003/0233189 A1 | 12/2003 | Hsiao et al. |
| 2004/0002894 A1 | 1/2004 | Kocher |
| 2004/0004577 A1 | 1/2004 | Forster |
| 2004/0016796 A1 | 1/2004 | Hanna et al. |
| 2004/0027180 A1 | 2/2004 | Usami |
| 2006/0092014 A1 | 5/2006 | Onderko et al. |
| 2006/0149635 A1 | 7/2006 | Bhatti et al. |

FOREIGN PATENT DOCUMENTS

| | | |
|---|---|---|
| EP | 04345424 | 1/1992 |
| EP | 0962407 A1 | 12/1999 |
| EP | 1388810 A2 | 2/2004 |
| FR | 2794550 A | 12/2000 |
| WO | 9724689 A1 | 7/1997 |
| WO | 0145063 A1 | 6/2001 |
| WO | 0150407 A1 | 7/2001 |
| WO | 0203340 A1 | 1/2002 |
| WO | 0219285 A2 | 3/2002 |
| WO | 03098528 A2 | 11/2002 |
| WO | 02099730 A2 | 12/2002 |
| WO | 03107030 A2 | 12/2003 |

OTHER PUBLICATIONS

Lindsay, Jeff et al., "Retail RFID Systems Without Smart Shelves", Nov. 7, 2003, 16 pages.

"Portal Reader", http://www.pelicansystems.co.uk/industrialcontrol/rfid_portalreader.asp, printed Mar. 4, 2005, 2 pages, Pelican Control Systems Ltd., England.

Staff Writers, "In Brief: Symbol Unveils RFID Reader," Network World, Inc., printed from http://www. networkworld.com/news/2005/061306infrabriefs.html, Jun. 13, 2005, 1 page, Network World, USA.

International Search Report and Written Opinion dated Jan. 25, 2008, for PCT/US/07/052948, 14 pages.

* cited by examiner

ADJUSTING DATA TAG READERS WITH FEED-FORWARD DATA

CROSS-REFERENCE TO RELATED APPLICATION

This application is a continuation-in-part of co-pending U.S. patent application Ser. No. 10/976,993, filed Oct. 29, 2004, entitled "Self-Adjusting Portals with Movable Data Tag Readers for Improved Reading of Data Tags," hereby incorporated by reference herein.

BACKGROUND OF THE INVENTION

Data tag technology such as radio frequency identification (RFID) technology refers to passive smart tags (miniature antenna-containing tags requiring no internal power supply) that may be embedded in or attached to a product or material to convey information that may be read by a scanner. Generally, conductive or passive smart tags include a data circuit and an antenna. In particular, smart tags include a semiconductor, a coiled, etched, or stamped antenna, a capacitor, and a substrate on which the components are mounted or embedded. A protective covering is typically used to encapsulate and seal the substrate.

In general, RFID systems and other data tag systems include readers and tags in which the tags generate an electromagnetic response to an electronic signal from a reader. The response signal is read by the reader, typically with a readable range on the order of a few feet, though broader or narrower ranges are possible. The signal generated by the tag includes information (e.g., an electronic product code) that identifies the tag or the article comprising the tag.

Typical RFID readers include a configurable power level. Using a proper power level for an RFID reader is a challenge in existing environments. If the power level is too low, many data tags may not be read properly. If the power level is too high, excessive radio frequency (RF) noise may be created that could interfere with other nearby RF devices and RFID reading operations.

SUMMARY OF THE INVENTION

Embodiments of the invention improve reception of a signal emitted by a data tag on an article moving relative to a data tag reader. In an embodiment, the invention includes a feed-forward system enabling adjustment of a configurable parameter of a data tag reader in response to a signal sent by another device providing information about the nature of an article having a data tag approaching the data tag reader.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
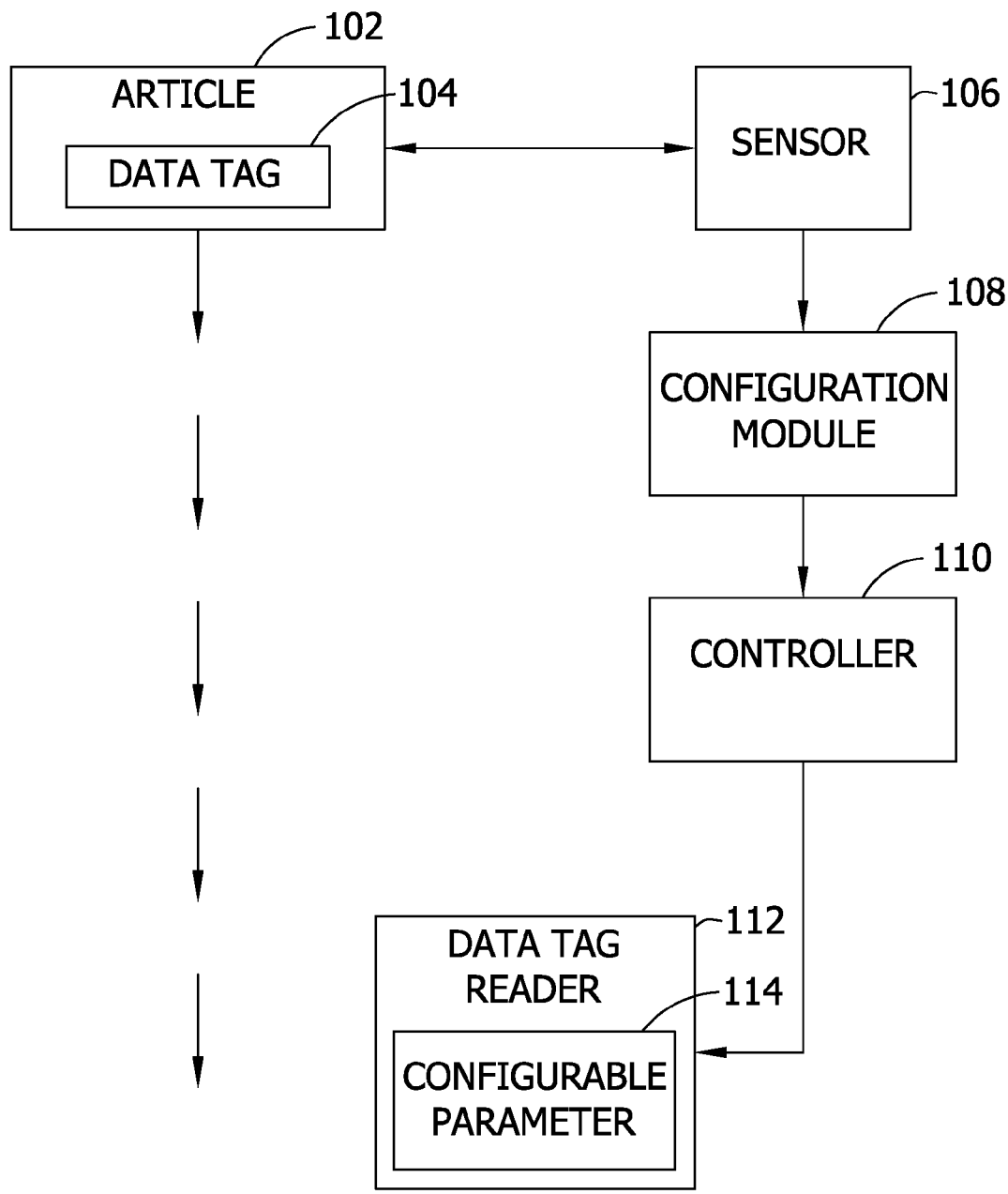
FIG. 1 is an exemplary block diagram illustrating an article moving past a data tag reader.

In an embodiment of the invention such as shown in FIG. 1, a data tag reader 112 is configured to increase reception of a signal emitted by a data tag 104 and/or increase the response of the data tag 104. The data tag 104, smart tag, or other identification means (e.g., a bar code) may be placed by hand or by machinery on an article 102. The data tag 104 may be placed inside or outside of the article 102. The data tag 104 stores identification information. In one embodiment, the information in the tag is used to assist in routing of the article 102 in the manufacturing process. The data tag reader 112 interrogates the data tag 104 affixed to the article 102.

A sensor 106 determines a characteristic of the article 102. A configuration module 108 generates a value for a parameter 114 of the data tag reader 112 as a function of the characteristic determined by the sensor 106. A controller 110 adjusts the configurable parameter 114 of the data tag reader 112 as a function of the value generated by the configuration module 108. The effect is to improve reading by the data tag reader 112 of the data tag 104 on the moving article 102 as the article 102 passes by or near the data tag reader 112.

In an embodiment, an easily readable tag or barcode on a pallet or on the exterior of package or case provides information about the nature of the data tags such as data tag 104 within. For example, a code on a barcode or data tag 104 on a pallet may be associated in a database with information about the items on the data tag 104 (e.g., an active, battery-powered tag). The information associated with the code on the barcode or data tag 104 is forwarded to one or more data tag readers (e.g., in a portal) including data tag reader 112 before the read is to be made thereby allowing the readers to adjust responsive to the information. In an embodiment, feed forward allows the readers to be adjusted to optimize a read just in time or slightly ahead of time. Alternatively or in addition, the information may be directly written to the data tag 104.

The code or information about the article 102 may be written to the data tag 104 during the pallet build phase (e.g., via a stretch wrapper). For example, as cases are assembled to build a pallet, the stretch wrapper or other device creates a record for the pallet with information that is associated with the code on the pallet using a system such as OATS or SAP to link the information to the electronic product code or barcode on the pallet.

The information about the article 102 may include a recommended power level for reading, a table of power levels corresponding to reader types, portal geometry, travel speed, or the like. The information may also include data adapted for use (e.g., by an algorithm) to determine the suitable power level for given conditions such as distance, orientation, travel speed, interference conditions, and the like based on the nature of the product and its packaging, the geometry of the stack of product, orientation of data tag reader antennas in the stack, or the like. In an embodiment, a software system operates on the information about the article 102 to determine the adjustment to make to the data tag reader 112 for subsequent reads of the load.

At least a portion of the information about the article 102 is provided by means other than the code on the barcode or data tag 104. Such information may include manually entered data from an operator (e.g., typed or spoken information with a voice recognition system), inferences made by a vision system (e.g., an imaging device that determines how many cartons are on a pallet or how cartons are stacked and oriented, or a system that determines what the product type is), readings from other label or taggant systems to identify a specific shipment and find its information in a database, or the like.

The data tag reader 112 has one or more configurable parameters such as configurable parameter 114 to effect an adjustment of the data tag reader 112. In an embodiment, the data tag reader 112 is configurable via an interface (e.g., via a universal serial bus). In such an embodiment, a computing device or a terminal constitutes the controller 110.

One or more of the configurable parameters may be adjusted for the article 102 (e.g., boost the power level and move the data tag reader 112). Adjustment of the data tag reader 112 results in improved reading of the data tag 104. The adjustment may include an adjustment of a power level, the physical location of the data tag reader 112, interrogation frequency, read frequency, signal strength, signal orientation, physical orientation (e.g., revolving to change its angle relative to the base 108), operational mode, data communication protocols, frequency, anti-collision algorithms, or other behavior of the data tag reader 112. The data tag reader 112 may adjust its operation, for example, if it detects that the data tag 104 is an active tag with a strong signal, or tag operating at or optimized for a frequency other than the current frequency of the data tag reader 112. The data tag reader 112 may also, for example, adjust its signal strength and location in response to low measured response signals if the tag is too remote, or if there is interference from metal, fluids, or other materials, or if the orientation of the antennae associated with the tags is not well suited for the data tag reader 112.

In an embodiment in which the configurable parameter 114 comprises a data communications protocol, the configuration module 108 and/or controller 110 adjusts the data communications protocol based on response feedback from a multi-protocol read request. For example, data tag reader 112 issues a single read command in sequential order through sample protocols A, B and C, until a response is recognized and matched to one or more of the protocols. If no responses are recognized, the data tag reader 112 may enter a limited read state in which a read command is issued with each of the protocols for a predefined period of time until a response is recognized.

In an embodiment in which the configurable parameter 114 comprises an interrogation frequency, the configuration module 108 and/or the controller 110 adjusts the interrogation frequency based on the signal strength of the response from a multi-frequency sweep read request. Alternatively or in addition, the interrogation frequency is user-configurable via software control or a physical switch to limit operational bandwidth per regulatory region. If no responses are recognized, the data tag reader 112 may enter a limited read state in which a read command is issued on each of the frequencies for a predefined period of time until a response is recognized.

In an embodiment in which the configurable parameter 114 includes a read frequency, the configuration module 108 and/or controller 110 adjusts the read frequency based on the signal strength of the response from a multi-frequency sweep read request. Alternatively or in addition, the read frequency is user-configurable via software control or a physical switch to limit operational bandwidth per regulatory region. If no responses are recognized, the data tag reader 112 may enter a limited read state in which a read command is issued on each of the frequencies for a predefined period of time until a response is recognized.

In an embodiment in which the configurable parameter 114 includes a position of one or more antennas associated with the data tag reader 112, the configuration module 108 and/or controller 110 adjusts the position of the antennas based on a position and/or proximity sensor to determine location of article 102 and/or data tag 104. Sensors include, but are not limited to, optical, pressure, temperature, humidity, or other physically measurable variables. The position of the antennas may be adjusted responsive to either recognized and/or non-recognized variables. The response and/or position parameters of the antennas may either be automatically and/or manually set (e.g., by the user).

In an embodiment in which the configurable parameter 114 comprises an anti-collision algorithm, the configuration module 108 and/or controller 110 changes the anti-collision algorithm based on an initial or first response feedback of data tag 104 population and/or interrogation frequency sweep to determine an ambient radio frequency (RF) noise floor. Based on a predetermined threshold for the ambient RF noise floor, the anti-collision algorithm may be automatically and/or manually adjusted to facilitate improved data tag 104 read rate. The anti-collision algorithm may be proprietary and/or part of existing air-interface standards such as, for example EPCglobal Inc. Class 1 Generation 2 UHF RFID Protocol for Communications at 860 MHz-960 MHz Version 1.0.9.

In one embodiment, the data tag reader 112 reads the codes on multiple data tags including data tag 104 associated with articles or items that pass through the portal. The data tags may be associated with virtually anything such as pallets, cases, carts, automatically guided vehicles (AGVs), shopping carts, human beings, cars, trucks, train cars, subway vehicles, items on a carrier belt, items conveyed by pneumatic tubes, continuous webs, etc., which constitute means for moving items through the portal (e.g., a means for moving the article 102 relative to the data tag reader 112, or a base associated therewith).

Aspects of the invention are operable with any form of data tag 104 including, but not limited to, a smart tag and an active or passive radio frequency identification (RFID) tag. While some embodiments of the invention are described herein as being operable with radio frequency identification (RFID) systems, the invention is operable with any data tag means and data tag reader means. That is, the invention is not limited to RFID.

RFID smart tag technology is known and understood by those skilled in the art, and a detailed explanation thereof is not necessary for purposes of describing embodiments of the method and system according to aspects of the invention. RFID systems for improved manufacturing have been proposed for systems including the PIPE/STORM systems disclosed in commonly owned U.S. patent application Ser. No. 10/306,794, "Communication Between Machines and Feed-Forward Control in Event-Based Product Manufacturing," filed Nov. 27, 2002 by Markham et al., which is herein incorporated by reference.

In general, RFID chips may be read-only chips, which include a fixed electronic code, or they may be read-write chips, which allow new information to be added. The chips may also be associated with sensors to read sensor information and transmit a signal responsive to the information, such as a value from a biosensor. Exemplary smart tags including RFID technology associated with a sensor are the active labels of KSW Microtec (Dresden, Germany), including TEMPSENS® active smart labels for measuring and recording temperature.

RFID tags can take many physical formats, such as a microchip from 30 to 100 microns thick and from 0.1 to 1 mm across, joined to a minute metal antenna such as the Hitachi 2.45 GHz Mew chip. Another form is the "Coil-on-Chip" system from Maxell (Tokyo, Japan). Exemplary RFID vendors of tags and/or readers and associated systems include Intermec Technologies Corporation (Everett, Wash.), Symbol Technologies (Holtsville, N.Y.), AWID (Monsey, N.Y.), Philips Semiconductor (Eindhoven, The Netherlands), and Texas Instruments (Dallas, Tex.).

Data tag readers may also be integrated into or added onto a laptop, a personal data assistant (PDA) device, a cellular phone, or other electronic device. Data tag readers such as data tag reader 112 for use in the present invention may include any known variety, including multi-protocol readers (e.g., those of AWID) that scan multiple frequencies or that are adapted for reading a variety of RFID tags or other identification elements. Data tag readers such as data tag reader 112 may also include adaptive readers that adjust their scanning frequency, signal strength, and/or signal orientation or direction or the like to improve signal obtained from the tag or tags being read. Readers that adapt their frequency are discussed, by way of illustration, in U.S. Pat. No. 6,765,476, "Multi-level RF Identification System," issued Jul. 20, 2004 to Steele, herein incorporated by reference to the extent it is noncontradictory herewith.

The elements in FIG. 1 operate on various input data within the scope of aspects of the invention. For example, position information received from the sensor 106 by the configuration module 108 may include, but is not limited to, a location of the moving article 102 relative to any of the following: the sensor 106, the configuration module 108, the controller 110, and the data tag reader 112. Further, in one embodiment, the position information includes global positioning system coordinates of the moving article 102. In many cases, a given load or product type coming though a portal may have known characteristics that may be used to modify the data tag 104 read for best results. The optimum adjustment of one or more readers such as data tag reader 112 in the portal may be preprogrammed as a function of commonly received object types.

Information from systems such as logistics systems, SAP, or electronic data interchange (EDI) or bill of lading (BOL) systems can be used to send information to the portal about what is coming, so that the readers in the portal may be adjusted (e.g., moved into optimum locations) for the read. In another embodiment, the information may be received or obtained from a feed-forward process control system (see, for example, U.S Patent Publication No. US20030155415-A1, "Communication between Machines and Feed-Forward Control in Event-Based Product Manufacturing," published Aug. 21, 2003 by Markham et al., previously incorporated by reference herein).

In the example of FIG. 1, the sensor 106 is in communication with the configuration module 108. In other embodiments, the sensor 106 is physically associated with one or more of the other elements in FIG. 1 to determine information about the goods approaching or inside the portal, after which the data tag reader 112 is automatically adjusted in an optimum manner. For example, the sensor 106 may include a vision system for detecting a dimension of the article 102 (e.g., the article 102 is eight feet tall). In one embodiment, the configurable parameter 114 is the location of each data tag reader 112 and several data tag readers (not shown in FIG. 1) may be automatically positioned to cover an eight-foot vertical span. For a shorter article 102, the readers would be positioned at lower heights. In another example, the sensor 106 includes infrared or ultrasonic sensors to determine that a stack of goods is positioned on the right side of the portal, whereupon some data tag readers on an upper beam of the portal slide to the right or increase their power levels to improve the read. In other embodiments, the sensor 106 determines other material characteristics of the approaching article 102.

The configuration module 108 processes any of the different types of information received from the sensor 106 to calculate an adjustment to the data tag reader 112. In an embodiment in which the configurable parameter 114 comprises a location of the data tag reader 112, the configuration module 108 has knowledge of the location of the sensor 106 relative to the data tag reader 112. Means for obtaining and maintaining this knowledge is known in the art.

In an embodiment, the sensor 106, configuration module 108, and/or controller 110 are computer-executable modules or components including hardware, software components, and/or a processor.

The sensor 106 may be physically remote from the data tag reader 112 (e.g., separated by a distance of at least one meter, or at least about five meters), or may be physically near the data tag reader 112 (e.g., at least part of the sensor 106 is within about one meter of the data tag reader 112).

In an alternative embodiment, the sensor 106 and the data tag reader 112 may be integrated such that they are physically connected. For example, the sensor 106 may include a video camera (or, alternatively, a motion detector, a directional antenna for detecting the data tag 104, a photoelectric eye, etc.) for sensing the presence of objects, with the sensor 106 mounted on or near the data tag reader 112, such that the sensor 106 may move with the data tag reader 112. In other embodiments, the sensor 106 may be a camera near the data tag reader 112, but not moving with the data tag reader 112.

In an embodiment, at least a part of the sensor 106 may be integrated with the article 102 or the data tag 104 associated with the article 102. For example, the article 102 or a device carrying the article 102 (not shown) such as a forklift (e.g., see U.S. Pat. No. 6,669,089, "Radio Frequency Identification Systems for Asset Tracking," issued Dec. 30, 2003 to Cybulski et al.), automated guided vehicle, truck, shopping cart, etc., may be connected to or otherwise associated with a GPS device that emits a signal indicating its location which can be read by the data tag reader 112 or another device (not shown) cooperatively associated with the data tag reader 112. In this manner, the location of the approaching article 102 can be inferred and the data tag reader 112 appropriately adjusted.

The article 102 or a device transporting the article 102 alternatively may be joined to or cooperatively associated with a position detection system that uses cameras, data tag readers (e.g., data tag reader 112) for reading floor-mounted data tags with known locations, or other means for tracking the location of the article 102, further adapted to communicate with the system shown in FIG. 1 such that the data tag reader 112 is adjusted appropriately for optimum reading of the data tag 104 associated with the article 102.

In one embodiment, the location of the article 102 and/or the tag associated with the article 102 may be determined using RFID technology. In addition to the use of a moveable data tag reader associated with the article 102 or transporting device for the article 102, wherein fixed tags with known locations are read to determine the position of the article 102, a warehouse or other environment may also comprise a plurality of readers mounted at fixed locations which detect the presence of the data tag 104 on the article 102 or the presence of another active or passive tag (not shown) mounted on a transporting device that is carrying the article 102. When a data tag reader at a known location detects the presence of the data tag 104 on the article 102 or the presence of another tag (not shown) on the transporting device (not shown), the location of the article 102 can be inferred.

RFID can be applied in other ways to determine the location of the article 102. This can be done, for example, using triangulation involving a plurality of RFID readers that read the tag, or with directional readers that scan for the location of a tag. See, for example, J. Lindsay, "Retail RFID Systems without Smart Shelves," published at IP.com as Document 21114D, Dec. 23, 2003, herein incorporated by reference. A directional reader with a directional and optionally moveable antenna or antenna array adapted to determine the approximate location of an RFID tag may be mounted on or near the data tag reader 112, or remote therefrom. One example of a reader system adapted for determining the spatial location of a tag is taught by D. G. Bauer et al. in "Intelligent Station Using Multiple RF Antennae and Inventory Control System and Method Incorporating the Same," U.S. Patent Publication 200030174099-A1, published Sep. 18, 2003, filed as U.S. patent application Ser. No. 10/338,892, assigned to Mead-Westvaco Corporation, herein incorporated by reference to the extent it is noncontradictory herewith. Another approach is described in U.S. Pat. No. 6,750,769, "Method and Apparatus for Using RFID Tags to Determine the Position of an Object," issued Jun. 15, 2004 to R. B. Smith, herein incorporated by reference to the extent it is noncontradictory herewith. The system of Smith employs an array of RFID tags, some of which are obscured relative to a reader by the presence of an intervening object. Analysis of the obscured and non-obscured signals provides spatial information about the object.

Figure 2:
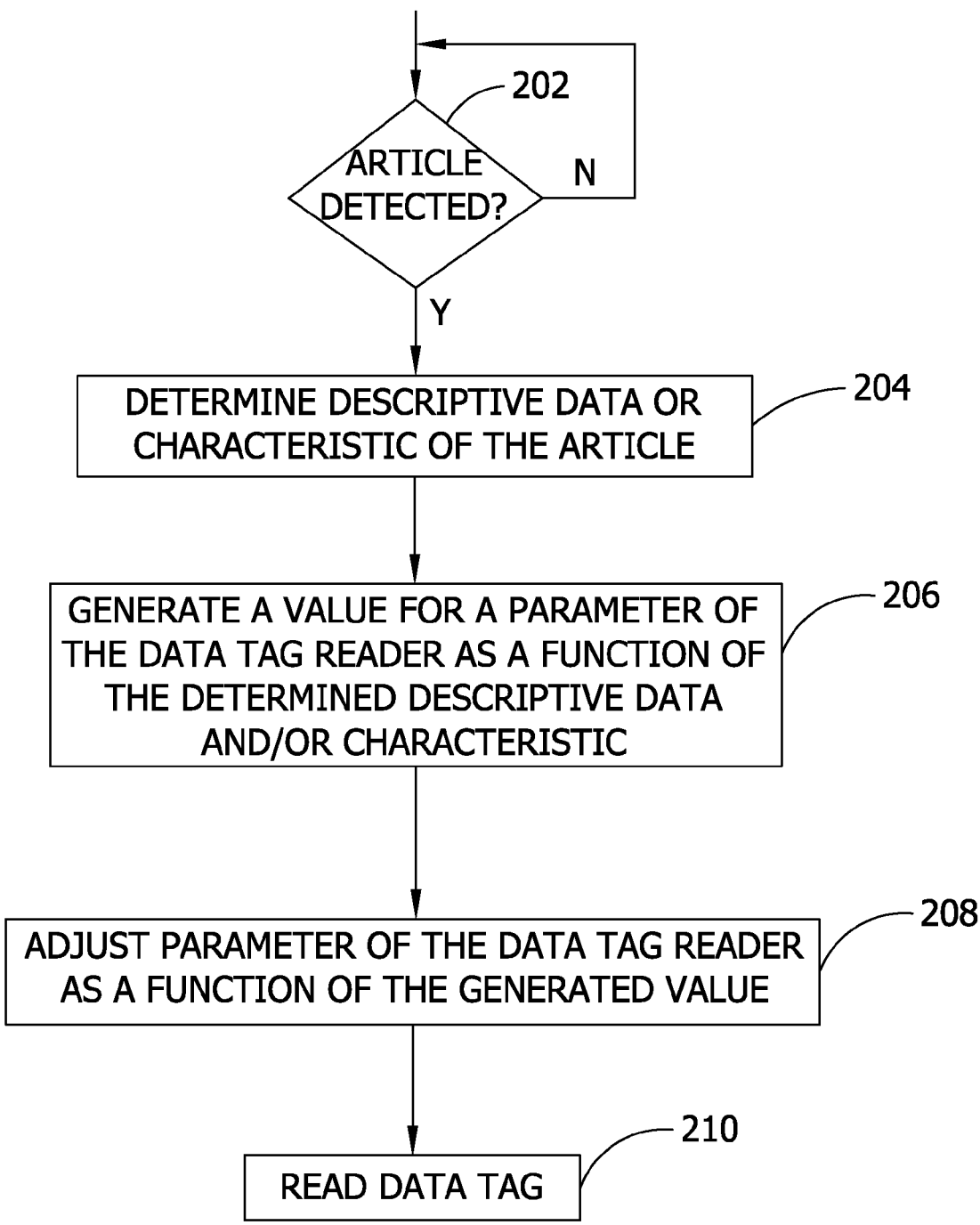
FIG. 2 is an exemplary flow chart illustrating operation of an embodiment of the invention.

FIG. 2 is an exemplary flow chart illustrating the adjustment of the configurable parameter of the data tag reader to improve readability of the data tag by the data tag reader. At 202, aspects of the invention determine if the article has been detected. If so, descriptive data or at least one characteristic of the article is determined at 204 (e.g., by a sensor). In an embodiment, the descriptive data includes a location of the data tag relative to the data tag reader, a location of the data tag relative to the article, a type associated with the data tag, a model associated with the data tag, and/or a brand associated with the data tag. Determining the descriptive data or characteristic comprises receiving, in an embodiment of the invention, the descriptive data from one or more of the following: a code on another data tag, a voice input system, a vision system, a human operator, and a feed-forward database. Determining the descriptive data includes, for example, one or more of the following: calculating the descriptive data, inferring the descriptive data, and receiving the descriptive data from a manual operator, receiving the descriptive data from a sensor, and receiving the descriptive data from a process control system.

At least one value is generated for at least one parameter of at least one data tag reader as a function of the determined descriptive data or characteristic at 206. The value may be generated explicitly, or inferred or calculated based on other data or other information about the article. In an embodiment, the value relates to at least one of the data tag, data tag reader, and article configuration. For example, the value may represent a particular power level, data communication protocol, frequency, anti-collision algorithm, or any other value for a configurable parameter of the data tag reader. The figures, description, and examples herein as well as elements not specifically described herein but within the scope of aspects of the invention constitute means for generating the value for the configurable parameter of the data tag reader.

Alternatively or in addition, the value may correspond to a dimension of the article, a location of the data tag on the article, or a desired location of the data tag reader relative to the article. In such embodiments, the data tag reader performs one or more operations on the input value to effect an adjustment. For example, the data tag reader may have access to a lookup table for correlating an input location of the data tag on the article with a power level (e.g., if the data tag on the far side of the article, boost the power to a particular level).

The parameter of the data tag reader is adjusted as a function of the generated value at 208.

In an embodiment, adjusting the configurable parameter occurs as the article passes by the data tag reader, or just before the article passes by the data tag reader. In one example, a delivery vehicle such as a clamp truck, forklift, automated guided vehicle, or the like comprises a reader, scanner, or other device capable of reading a tag or otherwise identifying the nature of the load. The device conveys this information in advance to a portal that is being approached or through which the load will otherwise be conveyed such that the portal adjusts the power levels of the readers in the portal in time for an effective read.

The data tag is read by the adjusted data tag reader at 210.

In an embodiment, one or more computer-readable media have computer-executable instructions for performing the method illustrated in FIG. 2.

Figure 3:
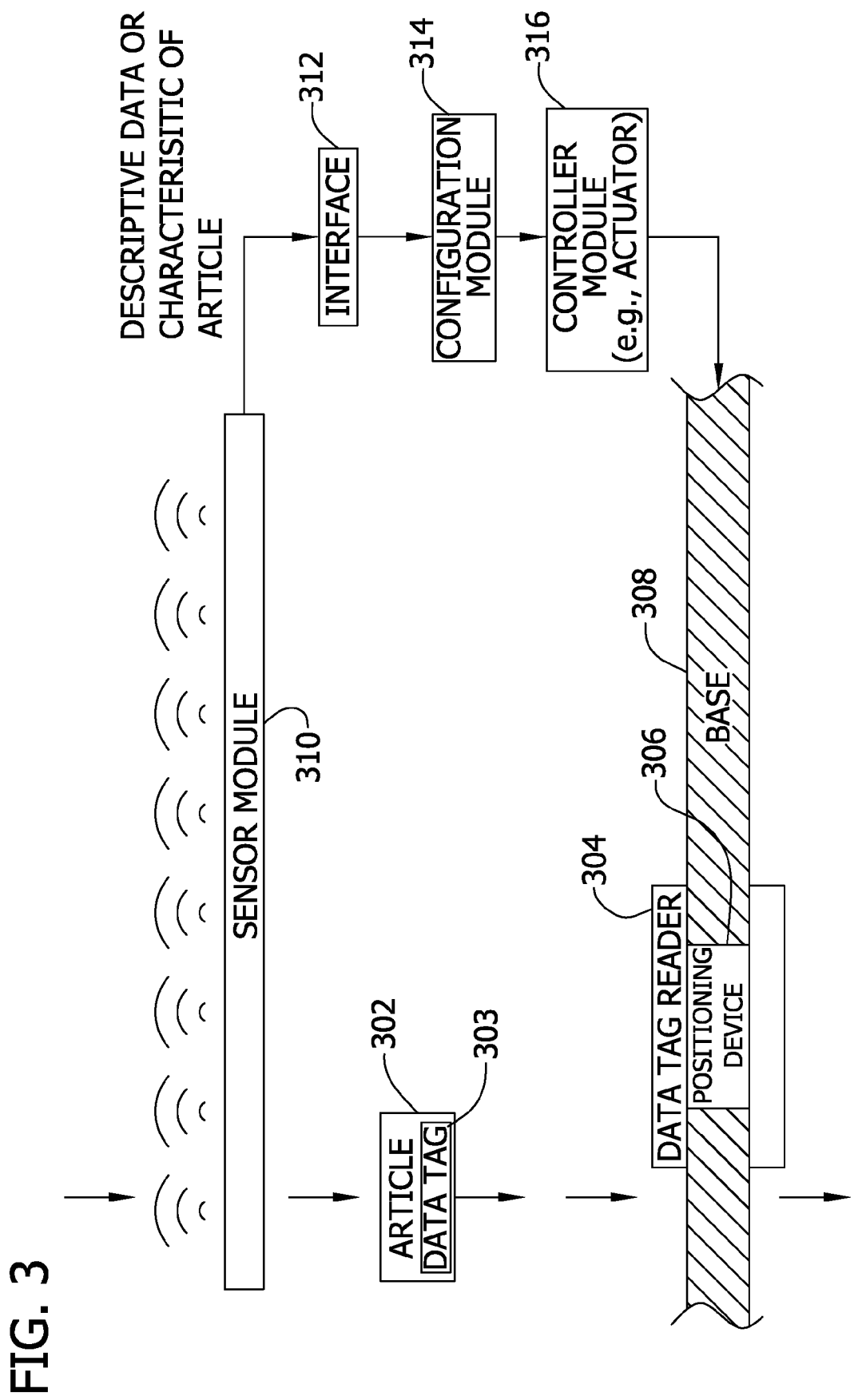
FIG. 3 is an exemplary block diagram illustrating a top view of an upper portal beam (e.g., a base) with a translatable positioning device to adjust the position of a data tag reader responsive to output from a sensor module.

Referring next to FIG. 3, an exemplary block diagram illustrates a top view of an upper portal beam (e.g., a base 308) with a translatable positioning device 306 to adjust the position of a data tag reader 304 responsive to output from a sensor module 310. In the exemplary embodiment of FIG. 3, the configurable parameter is a position of the data tag reader 304 relative to the base 308, an article 302, or an aspect thereof, and the data tag reader 304 is movable. In another embodiment, the data tag reader 304 is fixed. Such an embodiment includes a self-adjusting portal with movable data tag readers for improved reading of data tags including data tag 303 on the article 302. For example, if a transporting device such as a forklift is carrying the article 302, and the location of the forklift as it approaches a portal is determined to be near the left side of the portal, the moveable reader 304 on an upper beam of the portal may slide to the left to improve signal strength. Alternatively, if a pallet is approaching and is determined to have a short stack of objects (e.g., about three feet high), readers on the sides of the portal may automatically slide to a lower position such as about two feet above the ground to improve the read.

Referring again to FIG. 3, an exemplary block diagram illustrates a top view of an upper portal beam (e.g., base 308) with a translatable positioning device 306 to adjust the position of the data tag reader 304 responsive to output from the sensor module 310. In general, a portal unit through which articles pass comprises one or more data tag readers (e.g., scanners, transponders, interrogators, or antenna systems) such as data tag reader 304. For example, RFID portals for forklifts, pallets, and other loads are well known, such as the portals of Pelican Control Systems Ltd. (England) and that of U.S. Patent Publication 20020104013, "Electronic Vehicle Product and Personal Monitoring." Examples of other RFID portals include the Leads-Trakker portal for reading RFID tags on humans, such as guests at conventions wearing RFID-enable passes. Automated tollbooths using RFID scanners are also another form of portal within the scope of the present invention. However, the invention is not limited to RFID portals, and is operable with any form of portal.

In FIG. 3, the article 302 (e.g., a vehicle, a raw material in a manufacturing system, or a human) approaches the sensor module 310 and the base 308 associated with a portal. The article 302 has the data tag 303 mounted thereon. The base 308 (e.g., a worm gear) has mounted thereon the positioning device 306 (e.g., a carriage) holding the data tag reader 304. The positioning device 306 is capable of translation along the base 308 to position the data tag reader 304 in a desired location. The sensor module 310 includes one or more position sensing elements or other position sensors (e.g., motion sensors, video cameras, radar devices, metal detectors, eddy current detectors, pressure sensors embedded in a floor or mat, infrared sensors, and the like) for determining position information or other positional data describing the position of the approaching article 302 relative to the base 308. In one embodiment, the sensor module 310 and base 308 are aligned such that position information determined by the sensor module 310 correlates to a location on the base 308. The sensor module 310 and/or other elements described herein constitute a means for generating the position information.

The sensor module 310 communicates the determined position information to a configuration module 314 via an interface 312. The configuration module 314 processes the position information to determine a desired location of the data tag reader 304. The configuration module 314 communicates with a controller module 316 to activate an actuator (e.g., a motor) to move the positioning device 306 relative to the base 308 to locate the data tag reader 304 in the desired location. In another embodiment, base 308 includes an arm configured to pivot the positioning device 306 responsive to the position information.

The data tag reader 304 reads or scans the data tag 303 on the article 302 as the article 302 moves by the data tag reader 304. In one embodiment, movement of the article 302 is slowed or momentarily halted once the article 302 is within range of the data tag reader 304. The slowing or halting may be responsive to information obtained from the sensor module 310, from the data tag reader 304, or other information about the articles approaching the portal in order to provide adequate time for effective reading of the signal. For example, if the data tag reader 304 detects a weak signal with significant noise or interference, the article 302 may need to halt or slow long enough for repeat readings, or long enough to allow the data tag reader 304 to iteratively try different locations or reading conditions to improve the read.

Figure 4:
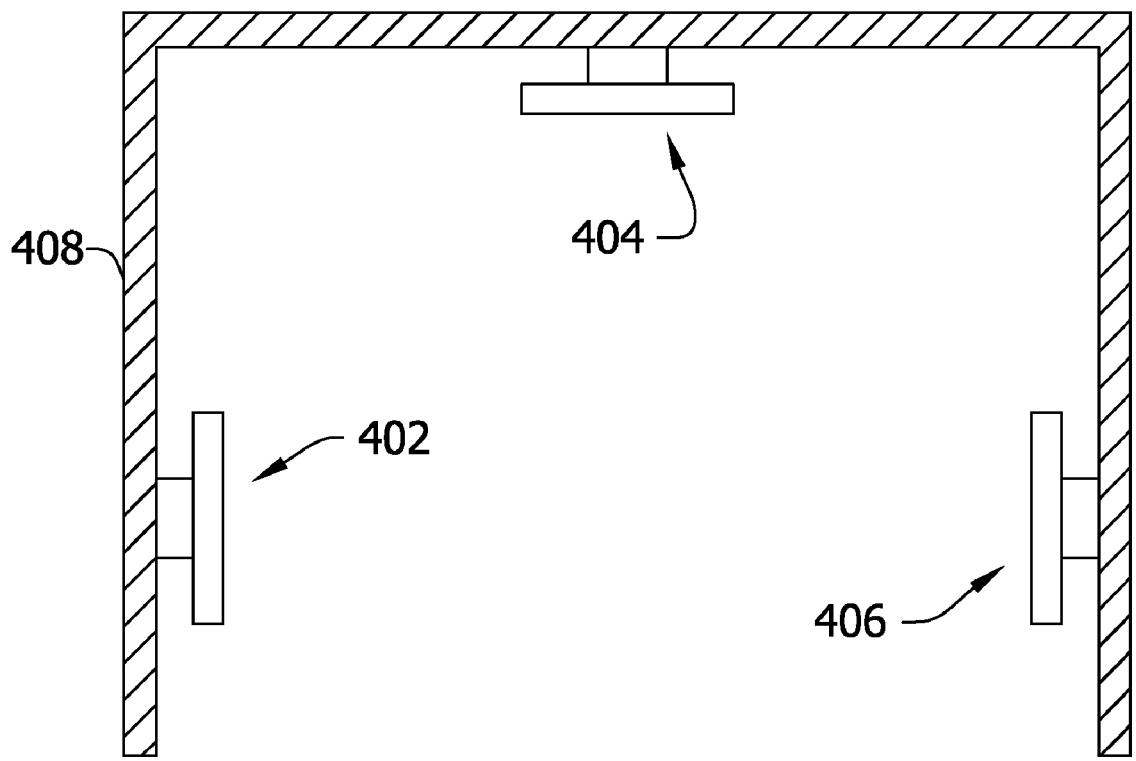
FIG. 4 is an exemplary block diagram illustrating a portal having three data tag readers mounted on worm gears.

FIG. 4 is an exemplary block diagram illustrating a portal having three data tag readers 402, 404, 406 mounted on worm gears or other translator elements. In this embodiment, the configurable parameter of each data tag reader 402, 404, 406 corresponds to a location for each of the data tag readers 402, 404, 406. The value for the configurable parameter for each data tag reader 402, 404, 406 may specify the desired location of the data tag reader 402, 404, 406, a relative offset from a base or other reference point, or the like. The article moves through the center of the portal. The data tag readers 402, 404, 406 translate along the worm gears to achieve improved reading of the data tag on the moving article. Translation of the data tag readers 402, 404, 406 may be along the sides of the portal (e.g., rails), but translation in any desired direction is within the scope of the invention. For example, embodiments of the invention are operable with a three dimensional position control system. In addition, some readers 402, 404, 406 may be fixed relative to the worm gears. Other translator elements are within the scope of the invention. For example, in addition to worm gears, the translator elements may include belts, pulleys, chains, cables, and/or other position adjusting means.

Figure 5A:
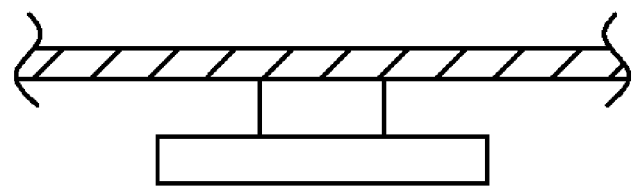
FIG. 5A and FIG. 5B are exemplary block diagrams illustrating a telescoping data tag reader assembly mounted on a worm gear.
Figure 5B:
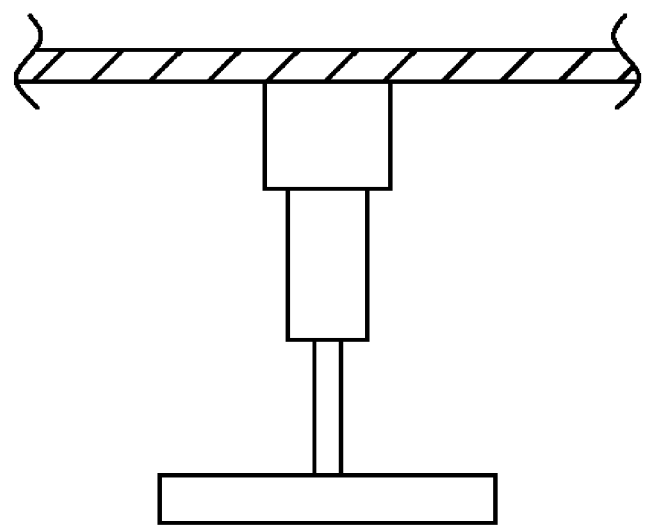

Referring next to FIG. 5A and FIG. 5B, exemplary block diagrams illustrate a telescoping data tag reader assembly mounted on a worm gear. In this embodiment, the configurable parameter of the data tag reader corresponds to a location for each of the data tag readers. The value for the configurable parameter in FIG. 5A and FIG. 5B may specify the desired location of the data tag reader, a relative offset from a base or other reference point, or the like.

The telescoping assembly moves the data tag reader towards or away from goods in or near the portal. The assembly includes a telescoping means for extending and retracting the data tag reader relative to the worm gear. FIG. 5A shows the data tag reader assembly retracted. FIG. 5B shows the data tag reader assembly extended. The telescoping data tag reader assembly positions the data tag reader in an optimal location for reading the data tag on the moving article (e.g., article 102 in FIG. 1).

The invention is operable with any form of computer or computing device known in the art. A user may enter commands and information into the computing device through input devices or user interface selection devices well known in the art such as a keyboard and a pointing device (e.g., a mouse, trackball, pen, or touch pad). The computer typically has at least some form of computer readable media. Computer readable media, which include both volatile and nonvolatile media, removable and non-removable media, may be any available medium that may be accessed by the computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The invention also includes the computing device itself when programmed according to the methods and techniques described herein.

The computer has one or more processors or processing units and a system memory. The computer may operate in a networked environment using logical connections to one or more remote computers, such as a remote computer. Generally, the data processors of computer are programmed by means of instructions stored at different times in the various computer-readable storage media of the computer.

Embodiments of the invention may be implemented with computer-executable instructions. The computer-executable instructions may be organized into one or more computer-executable components or modules executed by one or more computers or other devices. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention may also be practiced in distributed computing environments where tasks are performed by remote processing devices that are linked through a communications network. In a distributed computing environment, program modules may be located in both local and remote computer storage media including memory storage devices.

In operation, the exemplary computer executes computer-executable instructions such as those illustrated in the figures to implement aspects of the invention.

Although described in connection with an exemplary system environment, embodiments of the invention are operational with numerous other general purpose or special purpose environments or configurations. The exemplary system environment is not intended to suggest any limitation as to the scope of use or functionality of any aspect of the invention. Moreover, the system environment should not be interpreted as having any dependency or requirement relating to any one or combination of components illustrated in the exemplary operating environment.

It is to be understood that many other technologies are potential substitutes for the RFID embodiments disclosed herein. For example, RFID readers could be replaced with optical scanners, image analysis devices, arrays of chemical detection devices, and the like to allow other technologies for reading identification means to be applied.

A related technology within the scope of the present invention is Surface Acoustic Wave (SAW) technology. For example, InfoRay (Cambridge, Mass.) markets a passive smart tag that is said to achieve long ranges (up to 30 meters) using a Surface Acoustic Wave (SAW) device on a chip coupled with an antenna. The SAW device converts a radio signal to an acoustic wave, modulates it with an identification code, then transforms it to another radio signal that is emitted by the smart tag and read by a scanner. The identification code of the smart tag is extracted from the radio signal. RFSAW, Inc. (Dallas, Tex.) also provides minute Surface Acoustic Wave (SAW) RFID devices that may be used within the scope of the present invention.

Another related technology is ultra-wide band (UWB) technology. UWB technology permits wireless communication between objects using low-power electromagnetic transmissions. However, receivers and transmitters generally are both active but use very low power, typically less than that of radio frequency noise, relying on intermittent pulses that cover a broad band of frequencies rather than transmissions of a particular frequency. UWB technology may provide much higher spatial capacity (information transmission per unit area) than other wireless standards such as BLUETOOTH brand computer communication services or Institute of Electronics and Electrical Engineering (IEEE) 802.11a or 802.11b.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for reading a data tag on an article as the article is moving relative to a data tag reader, said system comprising:
   a data tag reader having a configurable parameter for improved reading of a data tag, said data tag reader being adapted to read a data tag mounted on the moving article; and
   a controller for controlling the configurable parameter, said controller being further adapted to adjust the configurable parameter of the data tag reader as a function of a value to increase reception of a signal emitted by the data tag, wherein the value relates to at least one of the data tag, data tag reader, and article configuration.

2. The system of claim 1, wherein the configurable parameter comprises a power level of the data tag reader, and wherein the controller adjusts the power level as a function of the value.

3. The system of claim 1, wherein the configurable parameter comprises a data communications protocol, and wherein the controller changes the data communications protocol based on responses to a plurality of read requests, each of the read requests being issued with a different data communications protocol.

4. The system of claim 1, wherein the configurable parameter comprises an interrogation frequency, and wherein the controller adjusts the interrogation frequency based on responses to a plurality of read requests, each of the read requests being issued with a different interrogation frequency.

5. The system of claim 1, wherein the configurable parameter comprises a read frequency, and wherein the controller adjusts the read frequency based on input from a user.

6. The system of claim 1, wherein the configurable parameter comprises an anti-collision algorithm, and wherein the controller adjusts the anti-collision algorithm based on a determined ambient radio frequency noise floor.

7. The system of claim 1, wherein the configurable parameter comprises a position of the data tag reader, and wherein the controller adjusts the position of the data tag reader based on a location of the data tag on the article.

8. The system of claim 1, further comprising means for generating the value.

9. The system of claim 1, wherein the data tag reader comprises a radio frequency identification reader.

10. The system of claim 1, wherein the data tag reader comprises an antenna, wherein the configurable parameter comprises an antenna position, and wherein the controller adjusts the antenna position as a function of the value.

11. The system of claim 1, wherein the value represents one or more of the following: a dimension of the article, a location of the data tag on the article, and a desired location of the data tag reader relative to the article.

12. The system of claim 1, wherein the article comprises a raw material, further comprising a means for moving the article relative to the data tag reader, and wherein the means for moving the article relative to the data tag reader comprises one or more of the following: a forklift, a shopping cart, a motor vehicle, an automatically guided vehicle, a pallet, a case, a human being, a train car, a subway vehicle, a carrier belt, pneumatic tubes, and continuous webs.

13. The system of claim 1, further comprising a sensor for determining a location of the article, wherein the sensor comprises one or more of the following: a position sensing element, a position sensor, a motion sensor, a video camera, a radar device, a metal detector, an eddy current detector, a pressure sensor embedded in a floor or mat, and an infrared sensor.

14. The system of claim 1, wherein the value relates to a relative location or dimension of the data tag, data tag reader, or article.

15. A method for adjusting a parameter of a data tag reader to improve readability of a data tag by the data tag reader, said method comprising:

determining descriptive data associated with the data tag; and adjusting a configurable parameter of the data tag reader responsive to the determined descriptive data to improve reading by the data tag reader of the data tag on the moving article.

16. The method of claim 15, wherein the descriptive data comprises a location of the data tag relative to the data tag reader, a location of the data tag relative to the article, a type associated with the data tag, a model associated with the data tag, and a brand associated with the data tag.

17. The method of claim 15, wherein determining the descriptive data comprises receiving the descriptive data from one or more of the following: a code on another data tag, a voice input system, a vision system, a human operator, and a feedforward database.

18. The method of claim 15, wherein determining the descriptive data comprises one or more of the following: calculating the descriptive data, inferring the descriptive data, and receiving the descriptive data from a manual operator, receiving the descriptive data from a sensor, and receiving the descriptive data from a process control system.

19. The method of claim 15, wherein adjusting the configurable parameter occurs as the article passes by the data tag reader.

20. The method of claim 15, wherein one or more computer-readable media have computer-executable instructions for performing the method recited in claim 15.

21. One or more computer-readable media having computer-executable components for improving the readability of a data tag on an article moving relative to a data tag reader, said components comprising:

a sensor module for determining a characteristic of the article;

a configuration module for generating a value for a parameter of the data tag reader as a function of the characteristic determined by the sensor module; and a controller module for adjusting the configurable parameter of the data tag reader as a function of the value generated by the configuration module to improve reading by the data tag reader of the data tag on the moving article.

22. The computer-readable media of claim 21, wherein the sensor module receives the characteristic from a process control system.

23. The computer-readable media of claim 21, wherein the data tag comprises a radio frequency identification tag.

* * * * *